(Model.)

J. WARREN.
Spring-Motor.

No. 226,813. Patented April 20, 1880.

Attest:
R. F. Barnes.
Warren Seely.

Inventor:
John Warren
by Ellis Spear
Atty

UNITED STATES PATENT OFFICE.

JOHN WARREN, OF DETROIT, MICHIGAN.

SPRING-MOTOR.

SPECIFICATION forming part of Letters Patent No. 226,813, dated April 20, 1880.

Application filed March 4, 1880. (Model.)

*To all whom it may concern:*

Be it known that I, JOHN WARREN, of Detroit, in the county of Wayne, State of Michigan, have invented a new and useful Improvement in Spring-Motors for Driving Light Machinery; and I do hereby declare that the following is a full and exact specification thereof.

This invention relates to that class of motors in which the force of a spring is used for the transmission of power, and it transmits the rectilinear force stored up in a spiral spring, when either compressed or extended, through suitable mechanism, to the machine to be operated. Its object is, first, to provide for the use of powerful but cheap spiral springs made from flat or round steel; second, to change the rectilinear motion of such springs into rotary motion; and, third, to equalize the varying tension of such springs, all in a simple and effective manner.

Figure 1:
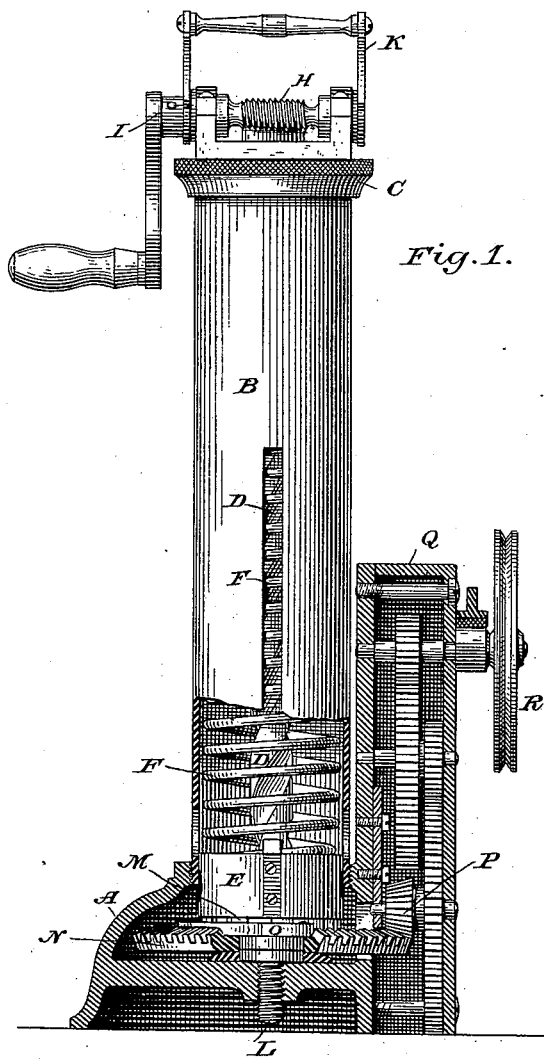
Figure 2:
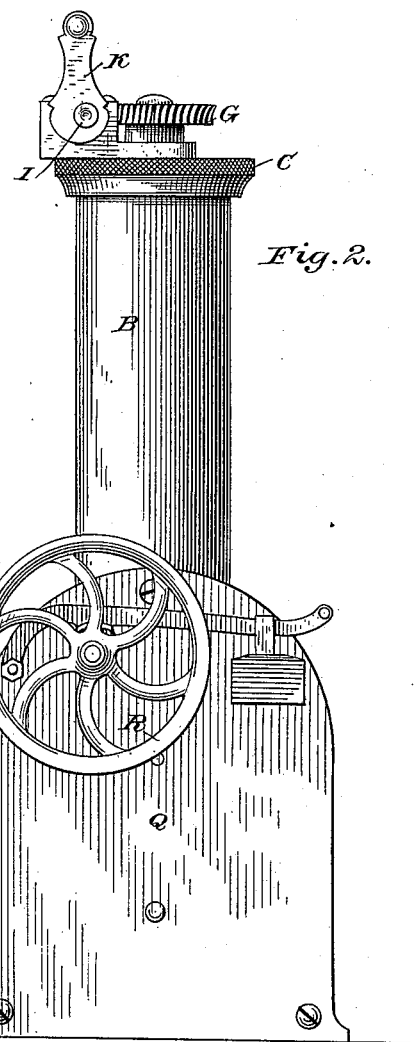
Figure 3:
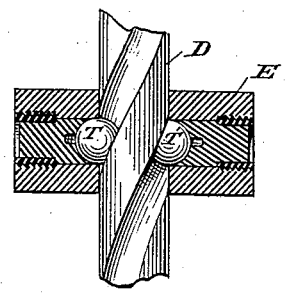
Figure 4:
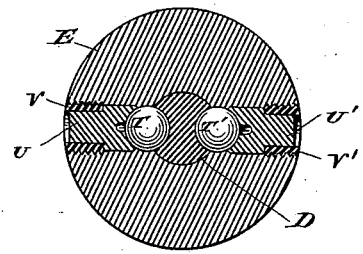

In the accompanying drawings, in which like letters designate like parts, Figure 1 is a side view of the motor, partly broken away, to show the motive power and gearing. Fig. 2 is a rear view of the same, and Figs. 3 and 4 are horizontal and vertical sections of the ball-nut.

A is the base-piece, in which the tube B is secured, the latter being covered by the cap C. D is a screw-shaft having one or more threads cut on it, (two being shown in the drawings,) having a pitch increasing from the top to the bottom, the pitch at the top being preferably greater than the angle of repose. This change in the pitch of the screw is intended to equalize the varying tension of the spring when more or less compressed, and should increase in a certain inverse ratio to that decrease of tension.

E is a ball-nut (subsequently described) working on the screw D and nearly filling the tube B. Between the nut E and the cap C is placed the spiral spring F, which may be fastened to both. In the tube B guides or ways may be formed, fitting projections or recesses in the nut, E; or, if the thread of the screw is opposed to the coil of the spring, they may be omitted and the ends of the spring fastened to the nut and cap. This spring F may be compressed by revolving the screw-shaft D, thus lifting the nut E toward the cap C, or by the use of special compressing machinery. I have, however, arranged to compress the spring F by means of a worm-gear wheel, G, attached to the upper end of the screw-shaft D, which passes through the cap C, turned by means of the worm H, cut on the shaft of the hand-wheel I. This shaft is eccentrically hung, so that by moving the lever K it can throw the worm H in and out of gear with the worm-wheel G. If the spring were intended to exert a tensile instead of a compressive strain, these operations would be reversed. The lower end of the screw D rests and turns on the pointed end of the adjusting-screw L.

Near the end of the screw-shaft D is fastened a ratchet-wheel, M, just above the bevel-gear wheel N, which plays loosely on the said shaft, and to the upper side of which are secured the pawls O. The bevel-gear wheel N engages with the bevel-pinion P, and, through suitable gearing contained in the housing Q, communicates motion to the band-wheel R, whence power can be taken to any mechanism desired to be operated.

As no nut as commonly made could work on a screw of varying pitch, the ball-nut E has been devised, and which is shown enlarged in Figs. 3 and 4, as constructed to work on a screw with double thread, as given in the drawings.

Around the screw D is fitted the cylindrical box E. At any selected points therein are placed the balls T T', half in the box E and half in the threads of the screw D, which are cut semi-cylindrical to fit them. Back of these balls are the spherically-hollowed washers U U' and the adjusting-screws V V'. In practice these washers and adjusting-screws may be omitted and the nut made in halves, with proper cavities for the reception of the balls, and the halves bolted or sleeved together. Thus, as these balls only touch the threads of the screw on a single line, notwithstanding the varying pitch, the balls will run in the threads and the nut will turn on any part of it, the same as one ordinarily constructed, but with much less friction.

I am aware that mechanism calculated to derive uniform power from the varying tension of the spring might be interposed in the train of gear or applied to the machinery to be operated, thus permitting the use of a screw of uniform pitch; and I do not therefore confine myself to the use of an increase-pitch screw and ball-nut, for which such equalizing devices would be equivalents.

The operation of this motor is as follows: The screw-shaft D being revolved by means of the worm-wheel G, screw H, and hand-wheel I, the spring F is compressed in the upper part of the tube B. On the release of the worm by the lever K the spring forces the nut E down the screw-shaft D, and the nut being kept from turning by means of the guides, or by the torsion of the spring when fastened to it, it forces the screw-shaft D to revolve, and the pawls O, falling into the teeth of the ratchet-wheel M, cause the bevel-gear wheel N to revolve also, which motion is transmitted through the train of gearing to the band-wheel R, and thence to the machine to be operated.

What I claim as my invention, and desire to secure by Letters Patent, is—

1. A spring-motor consisting of a tube or case, and a spiral spring, screw-shaft, and nut inclosed therein, whereby the expansion or contraction of the spring is converted into rotary motion, in the manner substantially as described.

2. The combination of the spring F with the shaft D, on which is cut a screw of varying pitch, with one or more threads, to equalize the varying tension of said spring, and a ball-nut, E, fitted to said screw-shaft, constructed and arranged substantially as described.

3. The ball-nut E, consisting of a hollow cylinder or box, one or more balls, T T', working on the screw D, and held in a cavity or cavities in box E, and made adjustable by the washers U U' and screws V V', constructed and arranged substantially as described.

4. The combination of the ball-nut E, carrying one or more balls, T T', made adjustable by the washers U U' and screws V V', with the screw D, substantially as described, and for the purpose set forth.

5. In a spring-motor, the combination of spring F, screw D, ball-nut E, with ratchet-wheel M, pawls O, bevel-gear wheel N, connected by a train of gearing to band-wheel R, substantially as described, and for the purpose set forth.

6. In a spring-motor, the combination of the spring F, screw D, ball-nut E, with the winding-gear, consisting of worm-gear wheel G, worm H, hand-wheel I, and the eccentrically-hung axle operated by lever K, substantially as described, and for the purpose set forth.

7. In a spring-motor, the combination of the spring F, screw D, ball-nut E, ratchet-wheel and pawls, intermediate gearing, band-wheel R, and winding-gear, constructed substantially of worm-wheel G, worm H, hand-wheel I, and eccentrically-hung axle operated by lever K, with the housing and casing, consisting of base-piece A, tube B, cap C, and housing Q, substantially as described, and for the purpose set forth.

JOHN WARREN.

Witnesses:
R. A. PARKER,
DWIGHT C. REXFORD.